(12) United States Patent
Parsoneault et al.

(10) Patent No.: US 6,402,383 B1
(45) Date of Patent: Jun. 11, 2002

(54) DESIGN METHODS FOR HIGHLY EFFICIENT HIGH SPEED FLUID DYNAMIC BEARING MOTORS

(75) Inventors: Norbert S. Parsoneault, Scotts Valley; Donald J. Macleod, Santa Cruz, both of CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/512,126

(22) Filed: Feb. 24, 2000

Related U.S. Application Data

(60) Provisional application No. 60/121,683, filed on Feb. 25, 1999.

(51) Int. Cl.[7] .............................................. F16C 32/06
(52) U.S. Cl. .................................... 384/100; 384/907.1
(58) Field of Search ................................. 384/100, 107, 384/114, 907.1, 913; 29/898.04, 898.15

(56) References Cited

U.S. PATENT DOCUMENTS

| | | | | |
|---|---|---|---|---|
| 4,706,143 A | * | 11/1987 | Asada et al. ................. 360/107 |
| 5,142,173 A | * | 8/1992 | Konno et al. ........... 384/107 X |
| 5,210,665 A | * | 5/1993 | Nishizawa ............... 360/99.08 |
| 5,224,782 A | * | 7/1993 | Miwa et al. ................. 384/100 |
| 5,271,677 A | * | 12/1993 | Sherman et al. ............ 384/114 |
| 5,710,678 A | * | 1/1998 | Leuthold et al. ......... 360/99.08 |
| 5,738,446 A | * | 4/1998 | Ghosh et al. ............... 384/112 |
| 5,969,448 A | * | 10/1999 | Liu et al. ....................... 310/90 |
| 6,031,651 A | * | 2/2000 | Nakasugi ................ 384/121 X |
| 6,074,098 A | * | 6/2000 | Asai et al. ................... 384/112 |
| 6,127,756 A | * | 10/2000 | Iwaki et al. ............ 384/110 X |

* cited by examiner

*Primary Examiner*—Thomas R. Hannon
(74) *Attorney, Agent, or Firm*—Moser, Patterson & Sheridan, LLP

(57) ABSTRACT

The smallest shaft diameter while retaining rigidity is achieved using either ceramic or tungsten carbide. However, to maintain the stiffness of the shaft of the surrounding sleeve and supported therefrom by a hydrodynamic bearing, the gap must also be adjusted and diminished. According to this method, the shaft thickness and bearing gaps are optimized by first setting a ceramic shaft thickness, then modifying the gaps in relation to that thickness.

2 Claims, 2 Drawing Sheets

DESIGN METHODS FOR HIGHLY EFFICIENT HIGH SPEED FLUID DYNAMIC BEARING MOTORS

CROSS-REFERENCE TO A RELATED APPLICATION

This application claims priority to provisional application, Ser. No. 60/121,683 filed Feb. 25, 1999 and assigned to the assignee of this application; the priority of this provisional application is hereby claimed.

FIELD OF THE INVENTION

The present invention relates to the field of hydrodynamic bearing assemblies which provide for support and rotation of a high-speed spindle. More specifically, the present invention relates to improved methods for the optimum design of high-speed spindle motors.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm or arms which move radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally guarantee physical contact between raceway and ball, in spite of the lubrication layer provided by the bearing oil or grease. Hence, bearing balls running on the generally smooth but microscopically uneven and rough raceways, transmit this surface structure as well as their imperfection in sphericity in the form of vibration to the rotating disc. This vibration results in misalignment between the data tracks and the read/write transducer, limiting the data track density and the overall performance of the disc drive system.

Another problem is related to the application of hard disc drives in portable computer equipment and resulting requirements in shock resistance. Shocks create relative acceleration between the discs and the drive casting which in turn show up as a force across the bearing system. Since the contact surfaces in ball bearings are very small, the resulting contact pressures may exceed the yield strength of the bearing material, and leave long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The relative high viscosity of oil allows for larger bearing gaps and therefore greater tolerances to achieve similar dynamic performance.

Recent trends in high performance disc drives are toward higher speeds and lower rotating mass in both 2.5" and 3.5" disc drives. This leads a designer in the direction of adopting a smaller shaft diameter while maintaining conventional bearing gaps for manufacturability reasons, but conventional steel will quickly become the limiting factor in such designs.

SUMMARY OF THE INVENTION

To retain the smallest shaft diameter while retaining rigidity, the selection of ceramic, or tungsten carbide allows the most efficient design. However, to maintain the stiffness of the shaft of the surrounding sleeve and supported therefrom by a hydrodynamic bearing, the gap must also be adjusted and diminished. In a typical example, 3.4 mm shaft, with tighter journal gaps, can replace a 4 mm shaft saving 28% of journal power. According to this method, the shaft thickness and bearing gaps are optimized by first setting a ceramic shaft thickness, then modifying the gaps in relation to that thickness. To provide proper stiffness in the system, the gaps should be set more narrowly than expected.

Other features and advantages of the invention become apparent to a person of skill in the art who have studied the following detailed description of the preferred embodiment of the method and apparatus of the present invention given in conjunction with the accompanying drawings.

DETAILED DESCRIPTION OF A PREFERRED EMBODIMENT

Figure 1:
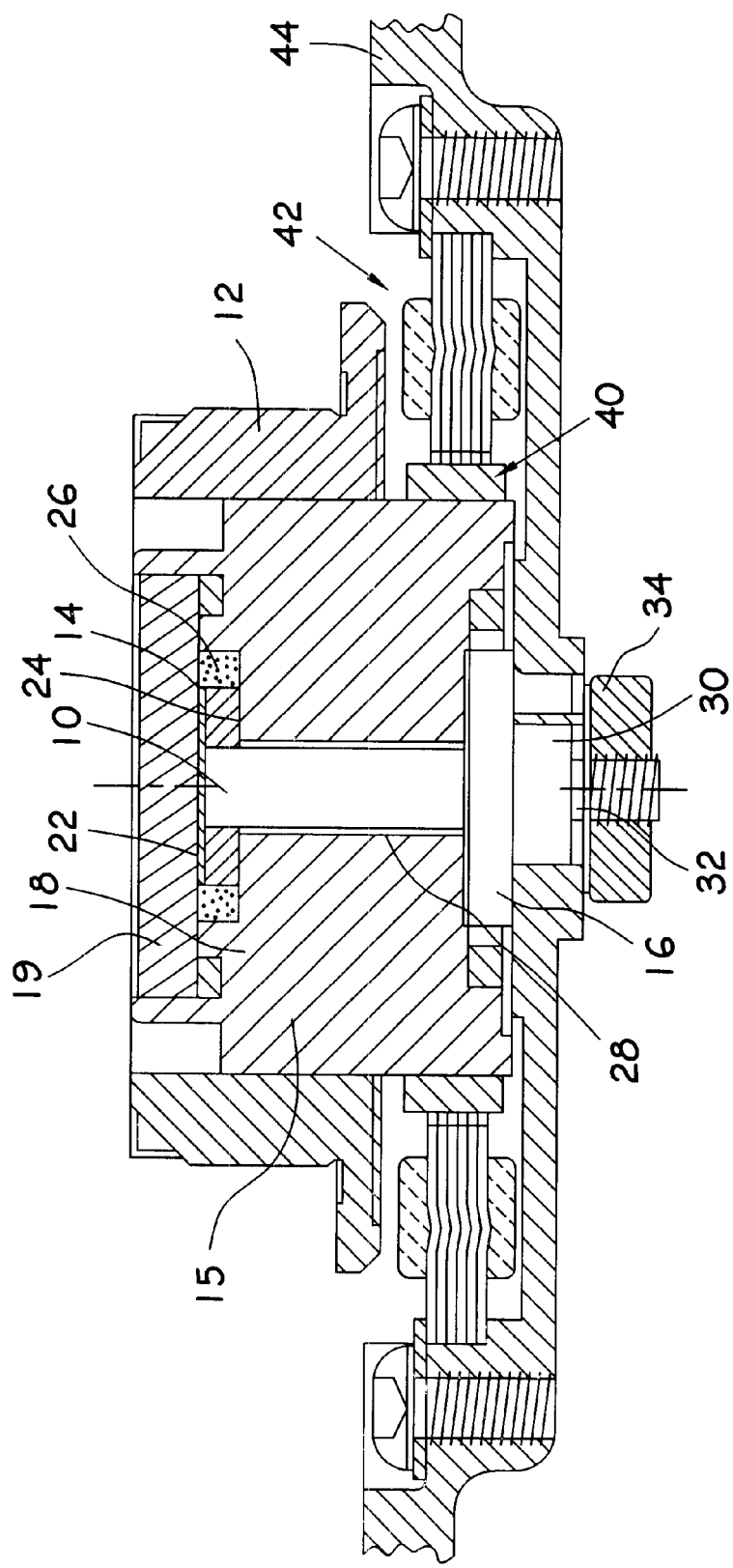
FIG. 1 illustrates a typical hydrodynamic bearing motor in which the present invention is useful.

The description to follow a preferred embodiment of the present invention is shown utilized in a spindle motor for a hard disc drive. However, the teachings of the present invention are useful in any hydrodynamic bearing which the shaft size is sought to be minimized and maintenance of stiffness is important. The methods and resulting product have many other uses than in hydrodynamic bearing disc drives and the invention is not intended to be limited to use in such an environment. However, the invention is especially useful in an invention such as a hard disc drive because of the importance of maintaining the stability and stiffness of the shaft while reducing the size of the shaft, especially as higher speeds in such disc drives become more common.

The basic structure of the motor, or at least as much is as relevant to this invention, includes a stationary shaft 10 and hub 12 supported on a sleeve 15 which rotates around the shaft. The shaft includes a thrust plate 14 in one end and ends in a shoulder 16 at the opposite end. Sleeve 15 supports a counterplate 19. One of the two opposing surfaces of the shaft/thrustplate assembly and hub/counterplate assembly typically carry cylindrical sections of spiral grooves, as is well-known in this type of technology. Fluid is supplied and maintained in the gap between all of the surfaces of the shaft 10 and the counterplate 19 and the facing surfaces of the sleeve 15 and thrustplate 14. It is this fluid which provides the support for the free relative rotation of the sleeve 15 and hub 12 relative to the shaft and thrustplate 14. The surfaces lubricated by this fluid include the top and bottom surfaces 22, 24 of the thrust plate 14, the radially outside surface 26 of the thrust plate, and the outside surface 28 of the circular shaft 10.

The end 30 of the shaft 10 which extends below should 16 is fastened into a base 44 of a disc drive by a not 34 threaded onto a screw extension 32 of the shaft.

Figure 2:
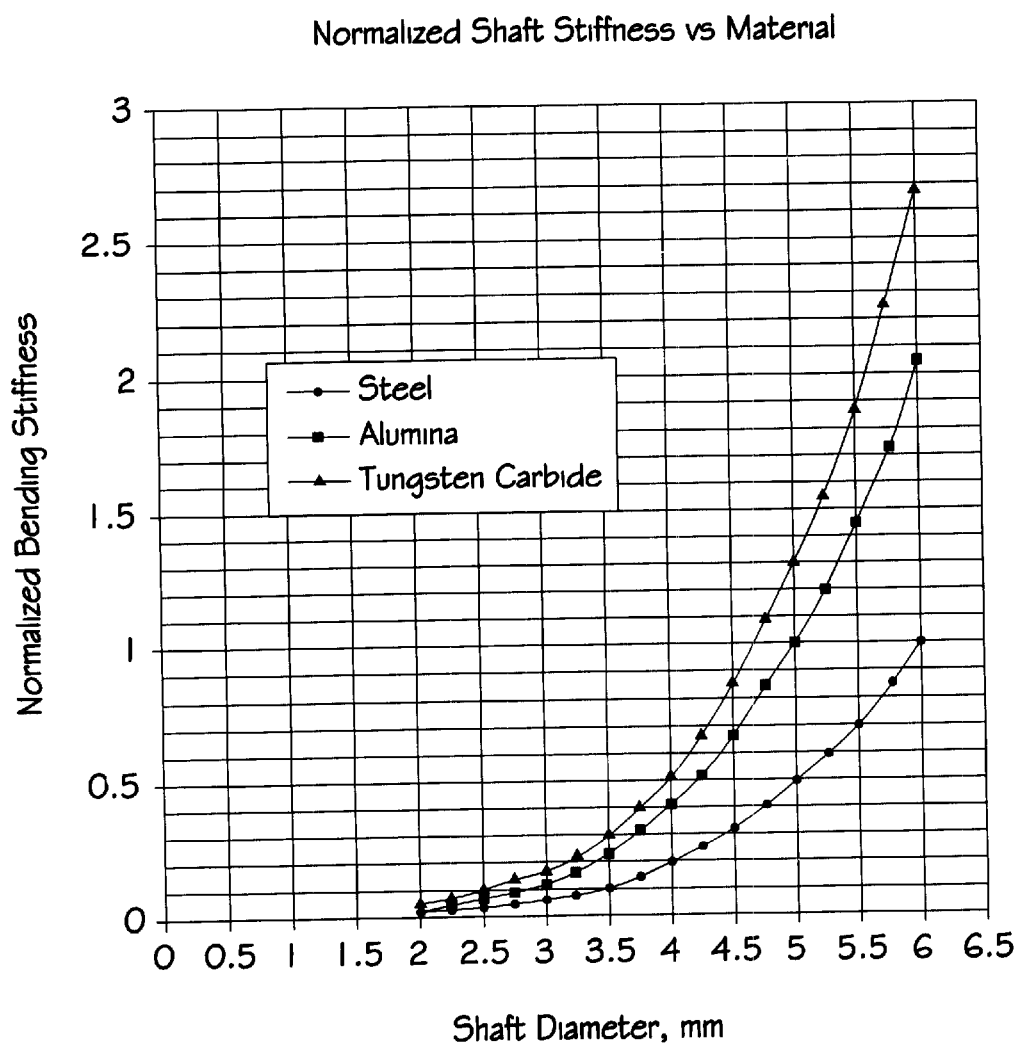
FIG. 2 shows shaft stiffness for shaft materials under consideration. The utility of various materials in forming the shaft for the hydrodynamic motor of FIG. 1 is useful, especially when thinner shafts are to be adopted.

The recent trends in the design of high performance hydrodynamic bearing motors such as shown in FIG. 1 are towards higher speeds, 15–20 krpm and lower rotating mass discs such as are shown herein supported on the hub 12. Conventional steel shafts which are historically the material of choice because of their cost and ease of machining are less desirable in these high-speed low mass applications. It is difficult to maintain the stiffness of the overall system as the size of the shaft gets smaller. Normally, the oil in the gap dominates the stiffness. Analysis of the utility of alternative materials has established that alternative materials such as ceramic alumina or tungsten carbide which are shown on FIG. 2 provides substantial benefits. These materials allow the development of designs with smaller shaft diameters while maintaining rigidity. For example, a 3.1 mm ceramic shaft with tighter journal gaps can be used to replace a 4 mm steel shaft; in a typical design this would save 28% of the journal power. The graph of FIG. 2 further shows that a ceramic shaft (alumina ceramic, for example) can allow a substantial reduction in shaft diameter while keeping the equivalent stiffness. This will give a substantial power savings. This feature becomes evident from FIG. 2 which shows that the normalized bending stiffness for either tungsten carbide or alumina ceramic is substantially better than is obtained from steel.

This change in material, however, presents the problem of maintaining the stiffness of the design. As noted above, normally the oil is relied on to maintain the stiffness. However, it has now been found that by reducing the size of the gap, the bearing stiffness and therefore the resistance of the disc to wobbling or other deflection from its plane of rotation can be maintained. It has also been found that an optimizing relationship can be established for how much the gap between the shaft and the surrounding sleeve must be reduced as the size of the shaft is reduced. It has been found that for a shaft reduction of 1 mm, that there must be an approximate accompanying 30% reduction in the size of the gap. If the appropriate gap width is reduced as needed, then the stiffness of the overall system can be maintained.

Thus, for example, since ceramic is 2.7 times stiffer than steel, a 3.5 mm diameter shaft can be replaced with a 2.7 mm diameter ceramic shaft. The result will be a shaft with the same stiffness.

However, a separate issue is maintaining bearing stiffness, where a fluid dynamic bearing is used. As noted above, the gap must be reduced to maintain stiffness; in the above example, the gap should be reduced from $4.0\mu$ to $3.1\mu$. The benefits of such redesign includes reduction in power consumption. In the above example, power consumed is reduced by 41%. Similar benefits can be achieved by using tungsten carbide.

Other features and advantages of this invention can become apparent of a person skilled in the art who studies the present invention disclosure. Therefore, the scope of the invention is to be limited only by the following claims.

What is claimed is:

1. A fluid dynamic bearing including a shaft and a surrounding sleeve separated by a gap, fluid in the gap supporting relative rotation of said sleeve and said shaft, the shaft being formed of a material selected from ceramic or tungsten carbide, the shaft being 27% reduced in diameter relative to a comparable steel shaft of the same stiffness, the gap being about 25% reduced in diameter.

2. A method of optimizing the stiffness of a fluid dynamic bearing defining a gap between a shaft and a sleeve, in a disc drive comprising the steps of forming a shaft of ceramic or tungsten carbide and having a diameter less than the diameter of a comparable steel shaft of the same stiffness, reducing the gap in said bearing by an amount proportional to the reduction in shaft diameter.

* * * * *